US011789119B2

(12) United States Patent
Li et al.

(10) Patent No.: US 11,789,119 B2
(45) Date of Patent: Oct. 17, 2023

(54) TIME SYNCHRONIZATION AND LATENCY COMPENSATION FOR EMULATION TEST SYSTEM

(71) Applicant: Keysight Technologies, Inc., Santa Rosa, CA (US)

(72) Inventors: Lei Li, Beijing (CN); Lee A. Barford, San Jose, CA (US); Jefferson B. Burch, Palo Alto, CA (US); Todd Steven Marshall, Los Gatos, CA (US); Hong-Wei Kong, Beijing (CN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 267 days.

(21) Appl. No.: 17/321,460

(22) Filed: May 16, 2021

(65) Prior Publication Data

US 2021/0356561 A1 Nov. 18, 2021

(30) Foreign Application Priority Data

May 17, 2020 (CN) .......................... 202010416240.5

(51) Int. Cl.
*G01S 7/40* (2006.01)
*G01M 17/00* (2006.01)
(Continued)

(52) U.S. Cl.
CPC .......... *G01S 7/4052* (2013.01); *G01M 17/00* (2013.01); *G01S 13/931* (2013.01); *G06F 9/455* (2013.01)

(58) Field of Classification Search
None
See application file for complete search history.

(56) References Cited

U.S. PATENT DOCUMENTS

2017/0115378 A1* 4/2017 Haghighi .............. G01S 13/931
2019/0152486 A1 5/2019 Schuette et al.
(Continued)

OTHER PUBLICATIONS

Mikael Kais et al., "A Multi-Sensor Acquisition Architecture and Real-Time Reference for Sensor and Fusion Methods Benchmarking", Intelligent Vehicles Symposium 2006, Jun. 13-15, 2006, Tokyo, Japan, pp. 418-423.
(Continued)

*Primary Examiner* — Bernarr E Gregory

(57) ABSTRACT

An emulation test system and method are provided for time adjusting emulated echo signals in response to a periodic electromagnetic signal. The method includes generating a scene simulation including a simulated object; generating a simulation frame indicating object transform information regarding the simulated object; calculating positions and velocities of an emulated targets corresponding to the simulated object using the object transform information; generating a ray tracing frame corresponding to the simulation frame indicating the calculated positions and velocities of the emulated targets; predicting a time point in a next feature in a feature pattern of the electromagnetic signal; calculating predicted target information of the simulated object at the predicted time point using the calculated positions and velocities; and generating an echo signal in response to the next burst of the electromagnetic signal using the predicted target information to compensate for latencies introduced by differences between real world and simulation times.

20 Claims, 3 Drawing Sheets

(51) Int. Cl.
    *G01S 13/931*     (2020.01)
    *G06F 9/455*     (2018.01)
    *G01S 13/00*     (2006.01)

(56) References Cited

U.S. PATENT DOCUMENTS

| | | |
|---|---|---|
| 2019/0303759 A1 | 10/2019 | Farabet et al. |
| 2019/0391234 A1* | 12/2019 | Gruber .................. G01S 7/4052 |
| 2020/0025875 A1* | 1/2020 | Maier .................... G01S 7/4052 |
| 2020/0300968 A1* | 9/2020 | Gruber .................. G01S 7/4052 |
| 2020/0319325 A1* | 10/2020 | Kong ..................... G01S 7/4052 |
| 2021/0055382 A1* | 2/2021 | Kong ..................... G01S 7/4052 |
| 2021/0055383 A1* | 2/2021 | Lee ........................ G01S 13/931 |
| 2021/0055384 A1* | 2/2021 | Lee ........................ G01S 13/931 |
| 2022/0171022 A1* | 6/2022 | Bourde ................. G01S 7/4095 |

OTHER PUBLICATIONS

Vincenzo Di Lecce et al., "GPS-aided lightweight architecture to support multi-sensor data synchronization", FMTC 2008—IEEE International Instrumentation and Measurement Technology Conference, Victoria, Vancouver Island, Canada, May 12-15, 2008, pp. 1-6.

Tobias Huck et al., "Precise Timestamping and Temporal Synchronization in Multi-Sensor Fusion", 2011 IEEE Intelligent Vehicles Symposium (IV), Baden-Baden, Germany, Jun. 5-9, 2011, pp. 242-247.

\* cited by examiner

TIME SYNCHRONIZATION AND LATENCY COMPENSATION FOR EMULATION TEST SYSTEM

PRIORITY

This application claims priority under 35 U.S.C. § 119 to Chinese Patent Application No. 202010416240.5, filed on May 17, 2020, which is hereby specifically incorporated by reference in its entirety.

BACKGROUND

Advanced driver-assistance systems (ADASs) and autonomous driving systems for vehicles rely on detection and ranging systems that use detection and ranging electromagnetic signals, including millimeter wave radar signals and light based lidar signals, for example. The detection and ranging electromagnetic signals are used to warn of forward collisions and backward collisions, to implement adaptive cruise control and autonomous parking, for example, and ultimately to perform autonomous driving on streets and highways. Millimeter wave automotive radar, in particular, has advantages over other sensor systems in that millimeter wave automotive radar can work under most types of weather and in light and darkness.

Conventional automotive detection and ranging systems typically have multiple transmitters and multiple receivers on the vehicle. Actual driving environments in which the detection and ranging systems may be deployed can vary greatly, and many such driving environments may be complex. For example, actual driving environments may contain numerous objects, and some objects encountered in actual driving environments have complicated reflection, diffraction and multi-time reflection characteristics that affect echo signals responsive to the detection and ranging electromagnetic signals. The immediate consequences of incorrectly sensing and/or interpreting echo signals may be that false warnings or improper reactions are triggered or warnings or reactions that should be triggered are not, which in turn can lead to collisions.

Testing requires that the ADASs and autonomous driving systems be faced with safety-critical situations. However, on-road testing is generally dangerous and inefficient. Therefore in-lab testing is preferable with regard to testing safety and efficiency. The in-lab testing may include drive scene simulation software and hardware echo signal emulators for different sensors, such that hardware-in-the-loop (HIL) scenario emulation for multiple sensors can be performed.

It takes time for the drive scene simulator and the corresponding hardware echo signal emulators to generate the emulated echo signals for a given sensor. As there are multiple detection and ranging electromagnetic signal sensors on the vehicle being tested, the HIL multi-sensor drive emulation solution faces two problems. First, the emulated echo signals for the different sensors are not synchronized in time. This causes sensor fusion algorithms on the vehicle to function incorrectly as the different sensors on the vehicle will receive signals giving inconsistent information about the emulated environment. Second, the emulated echo signals arrive at the sensors with delays compared to the scene simulation as provided by a drive scene simulator. The delays cause decision algorithms on the vehicle to make decisions later than they would otherwise be made, causing the HIL test to be less accurate than it should be. Therefore, effective techniques are needed to assure that emulated echo signals for multiple sensors are synchronized and current in order to provide accurate and reliable sensor testing.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
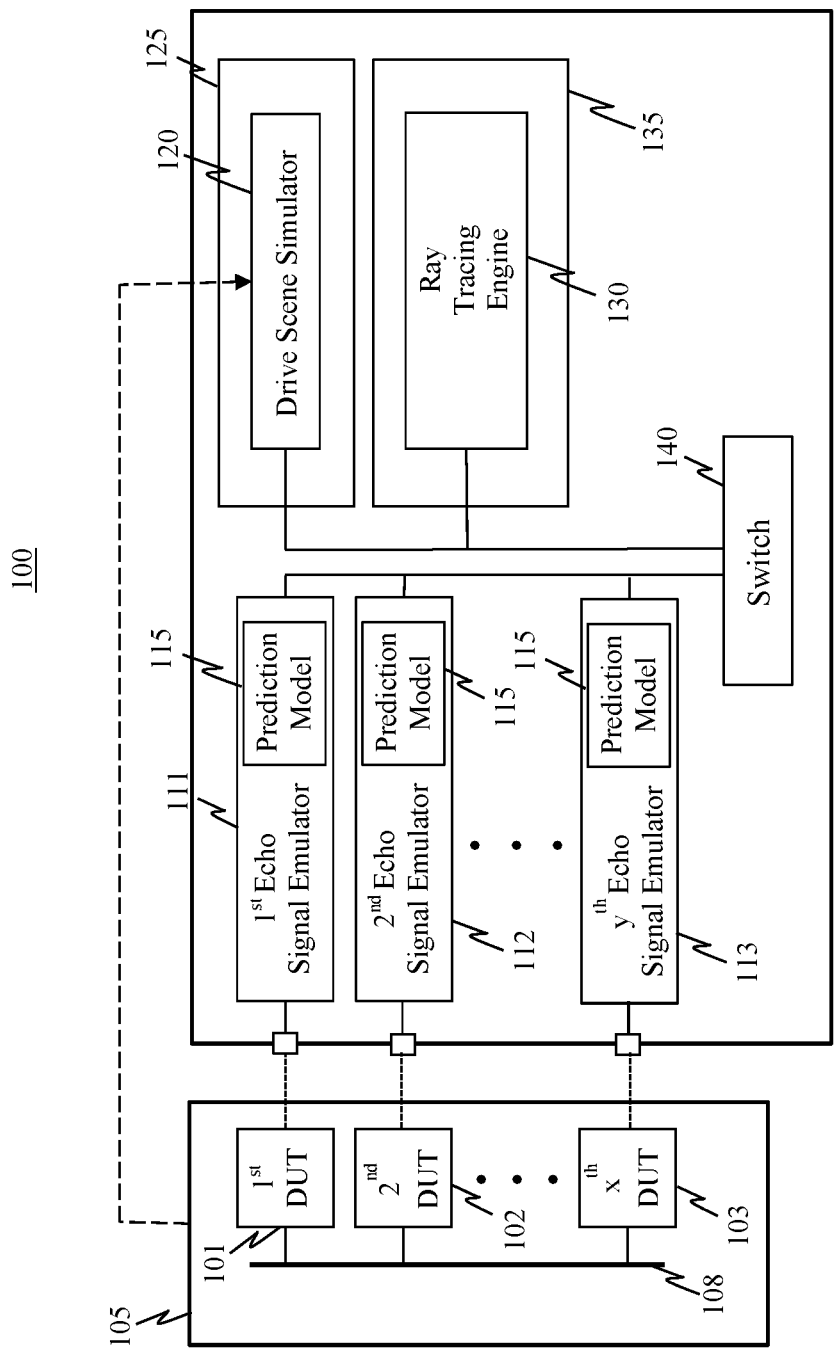
FIG. 1 is a simplified block diagram showing an emulation test system for testing vehicular detection and ranging electromagnetic signals, including time adjusting emulated echo signals, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a drive emulation system is able to emulate echo signals responsive to detection and ranging electromagnetic signal transmissions (e.g., radar and lidar signals) from multiple sensors on a vehicle under test, such as an automobile or other autonomous vehicle. The embodiments provide cost-effective, high performance target emulation in a scene simulation that scales well with an increased number of sensors. A common time base is established using a precise synchronization technology, such as the precision time protocol (PTP) IEEE 1588 standard (herein after "IEEE 1588"), for example, and thus each component of the multi-sensor drive emulation system is synchronized to sub-microsecond levels. As target information flows through the processing chain, starting with the scene simulation, latency caused by processing and communication operations is precisely monitored. A prediction model executed by echo signal emulators will be used to project the target information to a time in the near future when the target information is presented to the autonomous vehicle through emulated echo signals. When the vehicle's sensors are actively probing the simulated environment, the prediction model is used to project the target information to the precise time when the sensors are generating their probing signals (e.g., at the start of radar chirp frames).

As mentioned above, the common time base may be provided in accordance with IEEE 1588, for example, for real time clock synchronization at sub-microsecond levels. Providing real time clock synchronization using IEEE 1588 is relatively low cost, is highly scalable, is easily programmed and requires minimum system communication resources. Other common time bases for real time clock synchronization (e.g., synchronization over point-to-point trigger cables) may be incorporated, as long as the common time base is able to maintain real time clocks associated with various computer hardware components or other digital electronics synchronized to within microseconds. Using the common time base, all events of interest can be easily measured, such as start times for computations, and receive times of communication packets on the network, for example.

Generally, a drive emulation system according to various embodiments is very accurate in that it accurately emulates a large number of simultaneous targets in even demanding drive scenarios, such as head-on collision. Also, the drive emulation system is coherent in that it maintains time-alignment of information being presented to all the sensors in the autonomous vehicle under test, including radar sensors, lidar sensors, cameras, and global positioning satellite (GPS) receivers, for example, and provides loop stability to minimize loop delay for the HIL. With regarded to loop stability, in particular, the drive computer of the vehicle cannot tolerate processing delay in the feedback loop of the drive emulation system. As the vehicle reacts to its signal sensors, it makes decisions and changes steering, braking, and throttle settings, for example. These changes are immediately detected by the drive emulation system and cause corresponding changes to the simulated scene, which are then detected to the vehicle's sensors. The delay around this feedback loop must be minimized for proper performance. By utilizing numerous distributed computing resources across the drive emulation system (including general purpose CPUs, GPS, embedded processors, and FPGAs), the overall computation delay may be minimized by exploiting parallel processing. That is, the overall computation is properly divided into sub-computations, which can be executed in parallel. The sub-computations may be performed by the drive scene simulator and/or distributed into echo signal emulators that stimulate the vehicle's sensors, for example.

With regard to accuracy, the computations by the drive scene simulator are complex, as the scene must be deconstructed to properly analyze how the vehicle's sensors should respond. For example, the radar and lidar signals are very different, but are related to the scene image detected by the vehicle's cameras. Although run in parallel, these computations are complex and result in computation delays that must be compensated for by other parts of the drive emulation system.

With regard to coherency, the computation delay for each class of sensor on the vehicle may be different. For example, image information provided by a camera is relatively fast compared to corresponding information provided by radar. When the information is being presented to the corresponding sensor, it must be corrected using forward propagation techniques to the proper real world time. Desired corrections may be performed knowing the precise mapping between simulation time and real world time, and the desired real world time in the near future when the information should be presented to the vehicle's sensors. This involves computing at least the position and velocity of each target in the real world time in the near future when it will be used, and may further include computing the size, shape and/or acceleration of each target in the real world time in the near future, as well.

FIG. 1 is a simplified block diagram showing an emulation test system for testing vehicular detection and ranging electromagnetic signals, including time adjusting emulated echo signals, according to a representative embodiment. As will be appreciated by one of ordinary skill in the art having the benefit of the present disclosure, the embodiment applies to various types of detection and ranging electromagnetic signals, including vehicular radar and vehicular lidar, for example (referred to as "electromagnetic signals"), used in various capacities in current and emerging automobile applications. However, it is emphasized that the presently described emulation test system is not limited to automobile radar and lidar systems, and can be applied to other types of electromagnetic signals, including imaging signals for cameras, as well as other types of vehicles, including busses, motorcycles, motorized bicycles (e.g., scooters), watercraft and aircraft, that could employ a vehicular radar system.

Referring to FIG. 1, emulation test system 100 is arranged to test multiple devices under test (DUTs), which may be radar sensors or lidar sensors, for example, located on a vehicle under test 105. The DUTs are indicated by representative first DUT 101, second DUT 102 and $x^{th}$ DUT 103, although the depicted embodiment may be employed to test any number of DUTs, without departing from the scope of the present teachings. The first, second and $x^{th}$ DUTs 101, 102 and 103 may be connected into a controller area network (CAN) bus 108 on the vehicle under test 105. The vehicle under test 105 also includes electronic control unit (ECU) software and/or an ADAS computer (not shown), which provide vehicle control signals, such as braking, throttling and steering, to the emulation test system 100 as feedback for implementation of a scene simulation, as discussed below. The vehicle under test 105 may be connected to the emulation test system 100 by various types of wired and/or wireless network connections, as indicated by a dashed line.

The first, second and $x^{th}$ DUTs 101, 102 and 103 transmit periodic electromagnetic signals, such as radar signals or lidar signals, to the emulation test system 100, and receive corresponding emulated echo signals generated by the emulation test system 100 in response. The periodic electromagnetic signals may have periodic feature patterns, such as repetitive bursts of RF energy or light energy (laser pulses), for example, and include signal frames, each of which has at least one feature of the feature pattern in the electromagnetic signals. For example, a radar signal may have an RF burst pattern in a series of radar frames, where each radar frame includes two bursts of chirped frequencies. Of course, the radar frames may include fewer or more bursts of chirped frequencies, depending on the design characteristics of the radar signals, as would be apparent to one of ordinary skill in the art. Lidar signals may include signal frames, where the energy burst patterns comprise laser pulses.

The emulation test system 100 includes multiple echo signal emulators, indicated by representative first echo signal emulator 111, second echo signal emulator 112, and $y^{th}$ echo signal emulator 113. The number of echo signal emulators in use is typically the same as the number of DUTs being tested (i.e., y is equal to x), although the emulation test system 100 may use more or fewer echo signal emulators than DUTs being tested, without departing from the scope of the present teachings. The first, second and $y^{th}$ echo signal emulators 111, 112 and 113 are implemented as a combination of hardware and software configured to receive electromagnetic signals (e.g., radar or lidar signals) from the first, second and $x^{th}$ DUTs 101, 102 and 103, respectively, and to transmit corresponding emulated echo signals to the first, second and $x^{th}$ DUTs 101, 102 and 103 from simulated objects in response to the received electromagnetic signals. The first, second and $y^{th}$ echo signal emulators 111, 112 and 113 may be any type of known echo signal emulator, such as modulated reflection devices (MRDs), for example, capable of receiving electromagnetic signals and generating corresponding emulated echo signals in response, without departing from the scope of the present teachings. Each of the first, second and $y^{th}$ echo signal emulators 111, 112 and 113 includes one or more processing units, discussed below, for executing the software configurations, as well as IEEE 1588 time synchronization.

Each of the first, second and $y^{th}$ echo signal emulators 111, 112 and 113 includes or is able to access a prediction model 115 configured to predict a time point in the electromagnetic signal and to calculate at least predicted positions and velocities of the emulated targets at the predicted time point in the near future based on object transform information from the scene simulation. Generally, the prediction model 115 has two functionalities. First, the prediction model 115 predicts a time point of the next incoming feature (e.g., radar burst) of a frame. Generally, the electromagnetic signal is periodic, although the sensor (DUT) manufacturer may intentionally add some random deviations. Because the electromagnetic signal is periodic, the timing of next incoming feature may be predicted using the established pattern of features and/or frames including the features, including the length of the features and the time lapse between adjacently occurring features. For example, when the predicted time point is at the beginning of a feature in the electromagnetic signal, that time may be predicted by adding the known time lapse between features to a measured time of the beginning of a previously occurring feature. The pattern may be established by measuring the actual electromagnetic signal or using sensor specifications of the first, second and $x^{th}$ DUTs 101, 102 and 103. The established pattern may then be stored in the corresponding first, second and $y^{th}$ echo signal emulators 111, 112 and 113 to be accessed by the prediction model 115. Second, the prediction model 115 forward propagates and/or extrapolates the position and velocity of the emulated targets to the predicted time point. That is, provided with position, velocity and (optionally) acceleration of an emulated target at time point t, the prediction model 115 is able to determine the position and velocity of that emulated target at a predicted time point $t+\Delta T$, for example, by using the kinematics formulas, as known to one of ordinary skill in the art, where t is the time associated with object transform information being generated. In an embodiment discussed below with reference to FIG. 2, for example, $\Delta T=\Delta Ta+\Delta Tb+\Delta Tc+\Delta Td+\Delta Te$. Acceleration is assumed to be constant when forward propagating and/or extrapolating the position and velocity to the predicted time point.

In FIG. 1, the prediction model 115 is shown in each of the first, second and $y^{th}$ echo signal emulators 111, 112 and 113, e.g., executable by the one or more processing units. It is understood, however, that the first, second and $y^{th}$ echo signal emulators 111, 112 and 113 may access a common prediction model, without departing from the scope of the present teachings. Each of the first, second and $y^{th}$ echo signal emulators 111, 112 and 113 includes one or more antennas for receiving the electromagnetic signals from the first, second and $x^{th}$ DUTs 101, 102 and 103 to illuminate the emulated target, and transmitting the emulated echo signals from the emulated targets in response. The antenna(s) may be a horn antenna, for example, although other types of antennas such as patch antennas or patch antenna arrays may be incorporated.

Each of the first, second and $y^{th}$ echo signal emulators 111, 112 and 113 also includes a receiver connected to the antenna(s) for receiving the electromagnetic signals from one of the first, second and $x^{th}$ DUTs 101, 102 and 103, respectively. The receiver includes an analog to digital converter (ADC), so that each of the first, second and $y^{th}$ echo signal emulators 111, 112 and 113 provides a corresponding digitized electromagnetic signal for further processing. Each of the first, second and $y^{th}$ echo signal emulators 111, 112 and 113 also includes a transmitter connected to the antenna(s) for sending the emulated echo signals to same one of the first, second and $x^{th}$ DUTs 101, 102 and 103. The transmitter includes a digital to analog converter (DAC), so that each of the first, second and $y^{th}$ echo signal emulators 111, 112 and 113 transmits a corresponding analog emulated echo signal that emulates reflections from one or more emulated targets. Implementation of the first, second and $y^{th}$ echo signal emulators 111, 112 and 113 with regard to receiving and sending signals for various media, including radar and lidar, is well known to one of ordinary skill in the art. Each of the first, second and $y^{th}$ echo signal emulators 111, 112 and 113 includes precision timing hardware timestamp capability, such as IEEE 1588.

The emulation test system 100 further includes a drive scene simulator 120 implemented as software stored and executed by one or more processing units of a drive scene simulation server 125, and a ray tracing engine 130 implemented as software stored and executed by one or more processing units of a ray tracing engine server 135. The processing unit(s) for the drive scene simulation server 125 and the ray tracing engine server 135 may include network interface cards, for example, with precision timing hardware timestamp capability, such as IEEE 1588. In an embodiment, each of the first, second and $x^{th}$ DUTs 101, 102 and 103, discussed above, may have its own working cycle with regard to transmitting an electromagnetic signal, which is different from the working cycles drive scene simulator 120 and a ray tracing engine 130.

The emulation test system 100 may also include a switch 140, implemented as hardware and/or software, for connecting the drive scene simulator 120 and the ray tracing engine 130, and for selectively directing target information for generating the emulated echo signals from the ray tracing engine 130 to the first, second and $y^{th}$ echo signal emulators 111, 112 and 113. The first, second and $y^{th}$ echo signal emulators 111, 112 and 113 are therefore able to generate the respective echo signals using the electromagnetic signals received from the first, second and $x^{th}$ DUTs 101, 102 and 103 and target information received from the ray tracing engine 130 via the switch 140. The switch 140 is compatible with the same precision timing hardware timestamp capability, such as IEEE 1588, as the first, second and $y^{th}$ echo signal emulators 111, 112 and 113. The switch 140 may be an ethernet switch, for example, with IEEE 1588 hardware timestamp feature capability. Accordingly, the switch 140 provides general purpose ethernet data communications and IEEE 1588 time synchronization support.

The drive scene simulator 120 is programmed to generate a simulation of a real world drive scene that includes the simulated objects in an environment through which the vehicle under test 105 is to be driving. The simulated objects may include other vehicles, pedestrians, street signs, curbs, telephone poles, foreign objects in the path of the vehicle, and the like. The drive scene simulator 120 acquires and/or determines three-dimensional (3D) geometry information and object transform information (data) in accordance with one or more mathematical models of the scene simulation, where the one or more mathematical models are well known to one of ordinary skill in the art. The 3D geometry information is predefined and may be stored in a simulation scene file, which is loaded by drive scene simulator 120 prior to the scene simulation. The 3D geometry information may include a list of the objects in the simulated scene, and information relating to each of the simulated objects, such as position and whether each object is stationary or movable, as well as data indicating the 3D surfaces of each object. The drive scene simulator 120 forwards the 3D geometry information to the ray tracing engine 130 when they initialize, and the 3D geometry information does not change after the scene simulation starts. The object transform information of the simulated objects indicates transformations giving the dynamic locations of the simulated objects. The object transform information includes positions of the simulated objects, as well as the yaws, pitches and rolls of the (movable) simulated objects. The object transform information is continuously or periodically updated by the drive scene simulator 120 while the scene simulation is running, which provides simulation frames containing the object transform information at a frame rate.

As the drive scene simulator 120 may experience computational jitter due to the underlying operating system, the simulation time is mapped to the real world time that the vehicle under test experiences. Each simulation frame therefore has a simulation time in the scene simulation and a corresponding real world time that may be different from the simulation time, as discussed below with reference to FIG. 2.

The drive scene simulator 120 initially loads the 3D geometry information of a predefined scene from a file prior to scene simulation, and outputs the object transform information to the ray tracing engine 130 during the scene simulation. For example, the drive scene simulator 120 may be configured to generate a series of simulation frames including the object transform information with regard to one or more of the simulated objects. The simulation frames are generated according to the simulation time and frame rate provided by the drive scene simulator 120. That is, the drive scene simulator 120 maintains a simulation time base that is referenced to an arbitrary start time of the simulation. So, for example, simulation frame N is valid at the simulation time of N*frame rate. Therefore, each of the simulation frames has a corresponding simulation time associated with the frame length. The simulation time base may be a common time base provided in accordance with IEEE 1588, for example.

The simulation time is typically different from real world time, which is the actual time in which the vehicle under test 105 including the first, second and $x^{th}$ DUTs 101, 102 and 103 is operating. Although in practice, the simulated time is approximately equal to the real world time, it may differ enough to create an offset between the two times that causes latency and otherwise affects the accuracy of the scene simulation. Therefore, each of the simulation frames has a real world time corresponding to the simulation time associated with that frame. This real world time is the time actually used to generate the simulation frame. In an embodiment, the simulation time is fixed, while the real world time is varied. Alternatively, both the simulation time and the real time may be varied.

The ray tracing engine 130 is configured to initially receive the 3D geometry information before the scene simulation, and to subsequently receive the object transform information regarding the simulated objects from the simulation frames, and to calculate target information, during the scene simulation. The calculated target information includes one or more of updated positions, velocities, accelerations, and cross-sections (e.g., RCSs) of emulated targets corresponding to the simulated objects based on the received object transform information. An emulated target refers to an echo displayed so as to show the target information of a reflecting surface of the corresponding simulated object. Thus, it is understood that reference to the target information includes the calculated positions, velocities, accelerations, and cross-sections of the emulated targets. The ray tracing engine 130 generates ray tracing frames respectively corresponding to the simulation frames indicating the target information of the emulated targets according to the object transform information provided in the corresponding simulation frames. The frame rate of the ray tracing frames has no fixed relationship to the frame rate of the simulation frames. The processing unit for the ray tracing engine 130 (e.g., ray tracing engine server 135) may also include a network interface card, for example, with precision timing hardware timestamp capability, such as IEEE 1588. The ray tracing engine 130 may output the target information, including the position, velocity, acceleration and cross-section of each simulated object using the scene 3D geometry initially received from the drive scene simulator 120 before active simulation starts, and using the object transform information received from the drive scene simulator 120 during active simulation, simulation frame by simulation frame.

The ray tracing frames are output by the ray tracing engine 130 to the first, second and $y^{th}$ echo signal emulators 111, 112 and 113 through the switch 140. The first, second and $y^{th}$ echo signal emulators 111, 112 and 113 generate emulated echo signals using the electromagnetic signals received from the first, second and $x^{th}$ DUTs 101, 102 and 103 and the target information received from ray tracing engine 130. As mentioned above, each of the first, second and $y^{th}$ echo signal emulators 111, 112 and 113 includes (or is able to access) the prediction model 115, implemented as software stored and executed by one or more processing units, and may include a network interface card, for example, with precision timing hardware timestamp capability, such as IEEE 1588. Accordingly, the first, second and $y^{th}$ echo signal emulators 111, 112 and 113, the drive scene simulator 120, and the ray tracing engine 130 operate from a common time base for synchronizing the real world time at a sub-microsecond level.

The drive scene simulator 120, the ray tracing engine 130, and the first, second and $y^{th}$ echo signal emulators 111, 112 and 113, together with the first, second and $x^{th}$ DUTs 101, 102 and 103, the ECU software and the ADAS computer of the vehicle under test 105, provide the HIL for feedback, as is known by one of ordinary skill in the art. For example, in the HIL system, the brake, throttle and steer signals are fed back from the vehicle under test 105 to the drive scene simulator 120 to be incorporated in to the scene simulation, as indicated by the dashed line in FIG. 1.

The prediction model 115 is programmed to predict the emulated target list that will be used by the first, second and $y^{th}$ echo signal emulators 111, 112 and 113 to provide the emulated echo signals at a future time. That is, for each ray tracing frame, the prediction model 115 predicts a time point in the near future using a feature in an incoming electromagnetic signal. The "near future" refers to a period of time that is less than a predetermined period of the (periodic) electromagnetic signal, such as a frame length of a frame or of a burst length of a burst within a frame. The timing of the predicted time point being determined for the near future therefore depends on specific characteristics of the electromagnetic signal, although as a practical matter, the near future will be in the milliseconds level, for example, for most types of electromagnetic signals. For example, the feature may be an energy burst, such that the prediction model 115 may predict the time point in a next burst of the incoming electromagnetic signal received by one of the first, second and $y^{th}$ echo signal emulators 111, 112 and 113 from one of the first, second and $x^{th}$ DUTs 101, 102 and 103. The next burst is determined as the next full burst that is incoming to the respective one of the first, second and $y^{th}$ echo signal emulators 111, 112 and 113 when the prediction model 115 receives the particular ray tracing frame. The predicted time point may be a beginning point, a middle point or an end point of the next burst, although other points within the next burst or within the frame containing the next burst may be used. The energy burst may be a burst of RF energy for radar or a burst of laser energy (laser pulse) for lidar, for example.

The prediction model 115 then calculates predicted target information of the emulated targets at the predicted time point in the near future using the calculated target information of the emulated targets determined by the ray tracing engine 130. That is, the prediction model 115 uses the position, velocity and acceleration of the emulated target in the most recent ray tracing frame to forward propagate and/or extrapolate the position and velocity of the emulated target to the predicted time point, while the acceleration is kept constant. So, the prediction model 115 is driven by electromagnetic signal (e.g., periodic bursts), and not by the ray tracing engine 130. The predicted target information includes the position, velocity and (optionally) acceleration of the emulated targets, and may further include the cross-section of the emulated targets, depending on the extent and purpose of the scene simulation.

The prediction model 115 indicates the predicted target information of the emulated targets before the next burst of the electromagnetic signal is received by the one of the first, second and $y^{th}$ echo signal emulators 111, 112 and 113. The prediction model 115 provides a prediction segment that uses the target information from the latest ray tracing frame, before the target information of the next ray tracing frame is available. During each prediction segment, there will be one or more electromagnetic energy bursts arriving at the first, second and $y^{th}$ echo signal emulators 111, 112 and 113, and the prediction model 115 will use the target information from the same ray tracing frame for propagating and/or extrapolating the position and velocity of the emulated targets to the predicted time points. The prediction model 115 compensates for delay introduced by the real world time for each of the simulation frame, the drive scene simulator 120 and the ray tracing engine 130 when it calculates the predicted target information of the emulated targets at the predicted time point. Notably, operations of the first, second and $y^{th}$ echo signal emulators 111, 112 and 113, the drive scene simulator 120 and the ray tracing engine 130 are synchronized with the precision timing hardware timestamp capability at the sub-microsecond level.

As stated above, each of at least the drive scene simulator 120, the ray tracing engine 130, and the prediction model 115 in the first, second and $y^{th}$ echo signal emulators 111, 112 and 113, is implemented by one or more processing units. As used herein, a processing unit may include one or more computer processors, digital signal processors (DSPs), central processing unit (CPU), graphics processing unit (GPU), field-programmable gate arrays (FPGAs), application specific integrated circuits (ASICs), or combinations thereof, using any combination of hardware, software, firmware, hard-wired logic circuits, or combinations thereof. The processing unit may include its own processing memory for storing computer readable code (e.g., software, software modules, software engines) that enables performance of the various functions described herein. For example, the processing memory may store software instructions/computer readable code executable by the processing unit (e.g., computer processor) for performing some or all aspects of methods described herein, including various steps of the method described below with reference to FIG. 3.

As used herein, a processing memory, and any other memory (and databases) described herein, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings.

Figure 2:
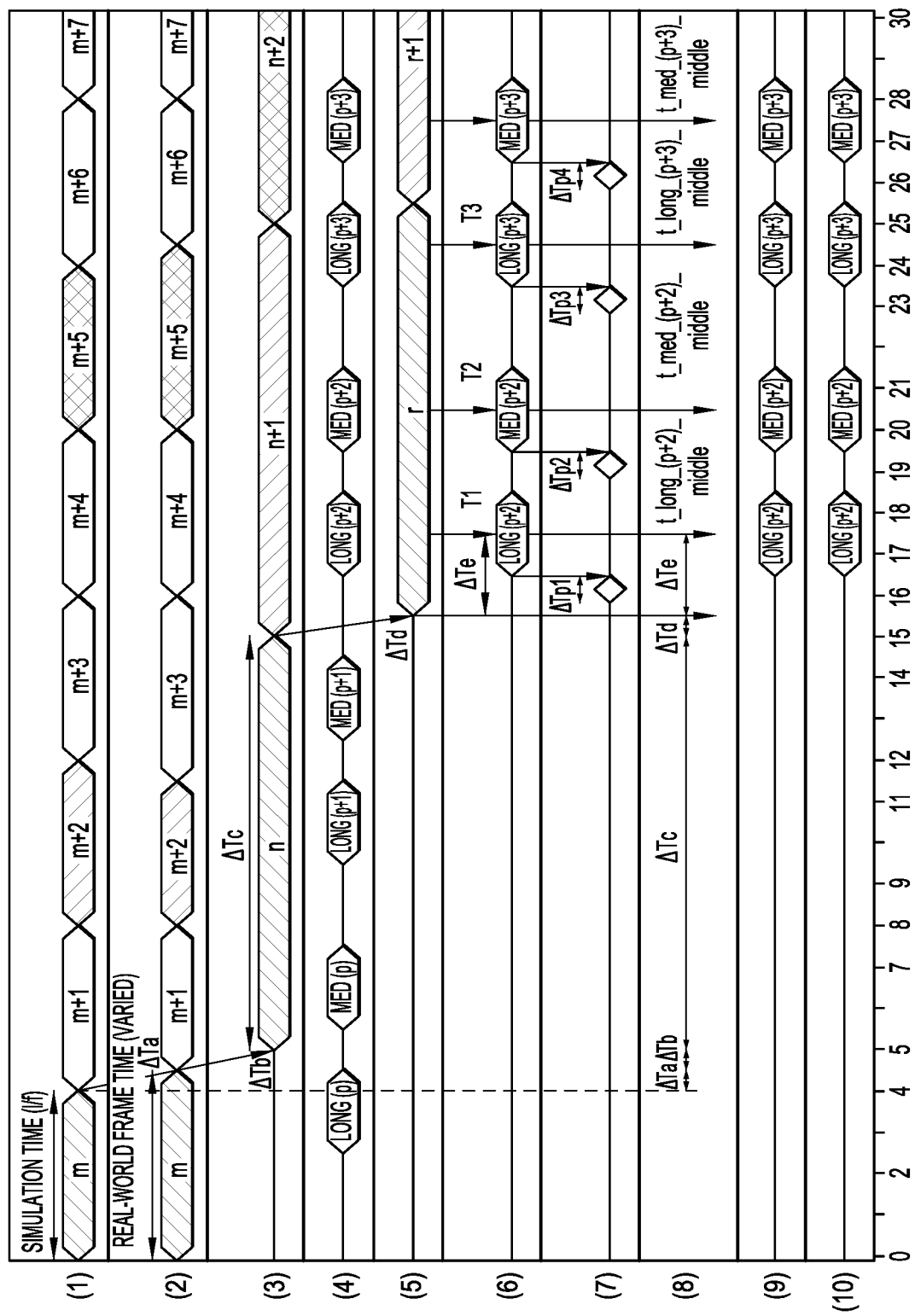
FIG. 2 is a simplified timing diagram showing time synchronization and latency compensation of an emulation test system for testing vehicular detection and ranging electromagnetic signals, according to a representative embodiment.

FIG. 2 is a simplified timing diagram showing time synchronization and latency compensation of an emulation test system for testing vehicular detection and ranging electromagnetic signals, according to a representative embodiment. Each of lines (1) through (10) show signals output by one of the components discussed above with reference to FIG. 1. The lines (1) though (10) are correlated to a timeline along the horizontal axis, which is indicated in microseconds. The timeline is not absolute time, but rather is intended to represent time points. For example, for the first time point at zero on the timeline, when the scene simulation is running, an absolute timestamp is recorded as simulation time zero. The absolute timestamp at the recognized beginning of the scene simulation may be an IEEE 1588 timestamp, for example, indicated by $T_{1588\_0}$.

Referring to FIG. 2, line (1) shows simulation frames determined by the drive scene simulator 120 in simulation time. In the depicted example, line (1) shows eight representative simulation frames, labeled m, m+1, m+2, m+3, m+4, m+5, m+6 and m+7, respectively. Also, for simplicity, it is assumed that the simulation time of each simulation frame is fixed, indicated by the simulation frames having the same length. It is understood, though, that the simulation times of the simulation frames may be varied, since the simulation frames are provided by the drive scene simulator 120, without departing from the scope of the present teachings. The fixed simulation time of each simulation frame is the reciprocal of the frame rate (1/f) at which the drive scene simulator 120 generates the simulation frames. As discussed above, the simulation frames include object transform information from the scene simulation. The object transform information includes position, yaw, pitch and roll of one or more simulated objects calculated by the drive scene simulator 120. The object transform information is sent to the ray tracing engine 130, discussed below. Although not indicated in FIG. 2, 3D geometry information is also initially sent to the ray tracing engine 130 by the drive scene simulator 120, e.g., before the start of the scene simulation.

Line (2) shows real world frames output by the drive scene simulator 120 in real world time. In the depicted example, line (2) shows eight representative real world frames, also labeled m, m+1, m+2, m+3, m+4, m+5 and m+6, respectively, corresponding to the eight representative simulation frames. That is, the real world frames are the simulation frames adjusted to the real world time. Therefore, the real world frames likewise include the same object transform information from the scene simulation as in the corresponding simulation frames.

Since the drive scene simulator 120 is a non-real time system, the actual time required to generate the simulation frames in real world time may vary depending on the time required to calculate the information for any particular frame and to assemble the frame, for example. Also, the real world times of the real world frames are varied, indicated by some of the real world frames having different lengths from others and/or having different lengths from the corresponding simulation frames. In the depicted example, the real world time of the real world frame m is longer than the simulation time of the corresponding simulation frame m by time difference ΔTa, for purposes of illustration. For example, referring to the timeline, the simulation frame m should finish at time $t_4$, but in actuality finishes at time $t_{4.5}$, so that the time difference ΔTa is 0.5. An IEEE 1588 timestamp $T_{1588\_m}$ may be recorded at $t_{4.5}$ marking the end of the real world frame m. Stated differently, the simulation time lags the real world time, and the time difference $\Delta Ta=T_{1588\_m}-T_{1588\_0}-m/f$, where m is the frame number and f is the simulation frequency in the simulation timeline, and m/f is the elapsed simulation time since the simulation starts.

Since the drive scene simulator 120 is not a real-time simulator in the various embodiments, the simulation frequency f is the frequency claimed by drive scene simulator 120. The real-world time that drive scene simulator 120 spends to compute each simulation frame will vary. For complex simulation frames that include information regarding more simulated objects than the less complex simulation frames, the drive simulator 120 spends more time on computation. Accordingly, for a more complex simulation frame (e.g., the $m^{th}$ frame), the drive scene simulator 120 spends more time than 1/f (e.g., spends 2/f) to compute the simulation frame. Then, drive scene simulator 120 may ignore the next (e.g., the $(m+1)^{th}$) simulation frame computation, and continue the subsequent (e.g., $(m+2)^{th}$) simulation frame computation after it completes the $m^{th}$ frame computation. This process may be referred to as catching up the real world timeline.

Although some drive scene simulators may support changes in the simulation rate, for example, by half (×0.5) or by doubling (×2), the drive scene simulator 120 in the embodiments described herein maintains the same simulation rate (×1). This means that the simulation timeline and real world timeline ideally should have same frequency. Of course, there will be time deviations, as a practical matter, which impact the HIL of the emulation test system 100. Accordingly, the drive scene simulator 120 may tune the simulation timeline during the scene simulation by skipping one or more next simulation frames. For example, when a simulation frame takes twice (2×) the allotted time to generate, the drive scene simulator 120 may skip generating the next simulation frame that would otherwise occur in simulation time, and generate a simulation frame at a later simulation time, so that the simulation time does not lag the real world time with no chance of catching up. In other words, the drive scene simulator 120 may be programmed to skip one or more next simulation frame(s) when it spends too much time generating a previous simulation frame, for example, when there are more simulated objects visible in the previous simulation frame, to enable the simulation time to catch up to the real world time.

The simulation frames are sent (as the time adjusted real world frames) to the ray tracing engine 130, which generates corresponding ray tracing frames. In an embodiment, the ray tracing engine 130 may not use information from all of the simulation frames in order to prevent excessive latency from accumulating during processing, as shown in FIG. 2. The ray tracing engine 130 continuously receives the simulation frames, saves the latest simulation frame in a memory. When it is ready to generate the next ray tracing frame, the ray tracing engine 130 simply uses the information in the latest stored simulation frame from the drive scene simulator 120 in real world time. In the depicted example, the simulation frames m, m+2 and m+5 are processed by the ray tracing engine 130 as discussed below, while the simulation frames m+1, m+3, m+4 and m+6 are not processed. Notably, the drive scene simulator 120 runs with its own frequency and has no relationship with that of ray trancing engine.

Line (3) shows the ray tracing frames output by the ray tracing engine 130 in real world time. In the depicted example, line (3) shows three representative ray tracing frames, labeled n, n+1 and n+2. The ray tracing frame n corresponds to the simulation frame m, the ray tracing frame n+1 corresponds to the simulation frame m+2, and the ray tracing frame n+2 corresponds to the simulation frame m+5. With regard to the simulation frame m, in particular, the ray tracing engine 130 receives the simulation frame m, calculates position, velocity, acceleration and cross-section (e.g., RCS) of one or more simulated objects using the object transform information from the simulation frame m, and generates the ray tracing frame n that includes the calculated position, velocity, acceleration, and cross-section as calculated target information. Generally, the ray tracing frames do not have fixed relationships with any particular simulation frames (or corresponding real world frames). Rather, the ray tracing engine 130 selects the latest simulation frame result provided by the drive scene simulator 120 for computation. The impact of any additional delay will be subsequently compensated by prediction model, as discussed below.

The ray tracing frames may be longer than the corresponding simulation frames (and real world frames), although the actual time required to generate the ray tracing frames in real world time may vary depending on the time required to calculate the corresponding cross-section, position, velocity and/or acceleration information and to assemble the ray tracing frame, for example. In the depicted example, the amount of time for the ray tracing engine 130 to perform calculations and assemble the ray tracing frame n is indicated by time difference $\Delta Tb$, and the length of the completed ray tracing frame n is indicated by time difference $\Delta Tc$, both in real world time. More particularly, the ray tracing frame n begins at time $t_{5.0}$ and ends at time $t_{15.0}$.

Line (4) shows frames of a periodic electromagnetic signal continuously transmitted by one of the first, second or $x^{th}$ DUTs 101, 102 or 103 during the relevant time period depicted in FIG. 2. For purposes of illustration, the electromagnetic signal is a periodic radar signal and the frames are radar frames, where each radar frame includes two radio frequency (RF) energy bursts. For example, a first RF energy burst of each radar frame may be a long range radar chirp signal at a first chirp frequency (LONG burst) and a second RF energy burst may be a medium range radar chirp signal at a second chirp frequency (MED burst). Of course, arrangements of periodic radar and other types of electromagnetic signals may vary to provide unique benefits for any particular situation or to meet application specific design requirements of various implementations, as would be apparent to one skilled in the art.

In particular, line (4) shows a first radar frame with LONG burst (p) and MED burst (p), a second radar frame with LONG burst (p+1) and MED burst (p+1), a third radar frame with LONG burst (p+2) and MED burst (p+2), and a fourth radar frame with LONG burst (p+3) and MED burst (p+3). As shown, the radar frames are being transmitted by one of the first, second or $x^{th}$ DUT 101, 102 or 103 while the drive scene simulator 120 and the ray tracing engine 130 are providing the simulation/real world frames and the ray tracing frames. The radar frames are being received by a corresponding one of the first, second and $y^{th}$ echo signal emulators 111, 112 and 113, as discussed below with reference to line (6).

Line (5) shows prediction segments of the prediction model, which calculates predicted target information of the emulated targets at a time point in the near future based on the calculated target information provided by the ray tracing frames. The predicted target information includes at least the position and the velocity of each of the emulated targets from the ray tracing frames, and may further include the size and shape of the emulated targets to provide a RCS, for example, depending on the extent and purpose of the target emulation.

In the depicted example, line (5) shows two representative prediction segments, labeled r and r+1, generated by a prediction model 115, executed by one or more of the first, second or $y^{th}$ echo signal emulators 111, 112 and 113. The prediction segment r corresponds to the ray tracing frame n, and the prediction segment r+1 corresponds to the ray tracing frame n+1. With regard to the prediction segment r, in particular, the prediction model 115 receives the ray tracing frame n from the ray tracing engine 130, predicts time points in next consecutive bursts of the electromagnetic signal, and calculates the predicted target information of the emulated targets at the predicted time points, as discussed below. In camera emulation test system, the prediction model may be run in corresponding software where a three-dimensional scene is rendered, and a corresponding video stream is output after the prediction model.

The prediction segments may be longer than, shorter than or the same as the corresponding ray tracing frames, as the real world time required to generate the prediction segments may vary depending on the number of bursts addressed by the particular prediction segment and the time required to calculate the predicted time points and the predicted target information of the emulated targets with regard to each of these bursts. In the depicted example, the amount of time for the prediction model 115 to begin performing the calculations is indicated by time difference $\Delta Td$ in real world time. In the depicted example, the prediction segment r begins at time $t_{15.5}$.

Line (6) shows the periodic electromagnetic signal as transmitted in line (4) being received by one of the first, second or $y^{th}$ echo signal emulators 111, 112 and 113 beginning after the start time of the prediction segment r. As a practical matter, the timing of receiving the periodic electromagnetic signal substantially matches the timing of transmitting the periodic electromagnetic signal, so the burst pattern shown in line (6) is substantially the same as the burst pattern shown in line (4). That is, line (6) shows the LONG burst (p+2) and the MED burst (p+2) of the third radar frame, and the LONG burst (p+3) and MED burst (p+3) of the fourth radar frame. The prediction segments are independent of the frames of the periodic electromagnetic signal. For instances, in the depicted example, the prediction segment r performs predictions with respect to the LONG burst (p+2) and the MED burst (p+2) in the third frame, and the LONG burst (p+3) in a first part of the fourth frame, while the prediction segment r+1 performs predictions with respect to the MED burst (p+2) in a second part of the fourth frame, as well as bursts from the next frame (not shown).

The prediction segments provided by the prediction model 115 may include calculations for multiple bursts of the electromagnetic signal, depending on the length of the prediction segment and the timing of the burst pattern in the electromagnetic signal. That is, the prediction model 115 determines the predicted time point of the next incoming burst, and performs forward propagation and/or extrapolation burst by burst, during this process. The ray tracing engine 130 just provides the target information to prediction model 115. For example, the illustrative prediction segment r shown in line (5) provides calculation results for three consecutive bursts of the electromagnetic signal shown in line (6). Therefore, the prediction model 115 predicts a first predicted time point T1 in the LONG burst (p+2), a second predicted time point T2 in the MED burst (p+2), and a third predicted time point T3 in the LONG burst (p+3). The prediction model 115 is able to predict these time points since the electromagnetic signal received by one or more of the first, second or $y^{th}$ echo signal emulators 111, 112 and 113 is periodic. The prediction model 115 calculates predicted target information of the emulated targets at each of the first, second and third predicted time points T1, T2 and T3. In the depicted embodiment, each of the first, second and third predicted time points T1, T2 and T3 is shown as a middle point of a corresponding next consecutive burst of the received electromagnetic signal, for example, although other points within the next burst (or points within other features of the electromagnetic signal) may be used without departing from the scope of the present teachings. Generally, the prediction model 115 is running in background, and predicts the predicted time point of next incoming burst. The prediction model 115 then uses the position, velocity and acceleration information of latest ray tracing frame to forward propagate and/or extrapolate to get the position and velocity information at the predicted time point.

With regard to the LONG burst (p+2), in particular, the prediction model 115 predicts the first predicted time point T1. In the depicted example, the start time of the prediction segment r is time $t_{15.5}$, the start and end times of the LONG burst (p+2) are $t_{16.5}$ and $t_{18.5}$, respectively, and the first predicted time point T1 is $t_{17.5}$. The prediction model 115 calculates predicted target information of the emulated targets at the first predicted time point T1 using the calculated cross-sections, positions, velocities and/or accelerations of the emulated targets from the ray tracing frame n, and includes the first predicted time point T1, and the predicted target information in the prediction segment r.

As mentioned above, the prediction model 115 predicts the first predicted time point T1 and calculates the predicted target information of the emulated targets at the first predicted time point T1 before the one or more of the first, second and $y^{th}$ echo signal emulators 111, 112 and 113 receive the LONG burst (p+2). Line (7) indicates this processing by the one or more of the first, second and $y^{th}$ echo signal emulators 111, 112 and 113. That is, the time required by the prediction model 115 to perform the prediction of the first predicted time point T1 and the calculations of the predicted target information of the emulated targets is indicated by a first processing time ΔTp1. In the depicted example, the first processing time ΔTp1 starts at $t_{16.0}$ and ends at $t_{16.5}$, at about the same time the LONG burst (p+2) is received, although the time required for the first processing time ΔTp1 may vary, as long as the processing is complete before receiving the LONG burst (p+2). An IEEE 1588 timestamp $T_{1588\_T1}$ may be recorded at $t_{17.5}$ marking the first predicted time point T1. In the same manner, the time required to perform the prediction of the second predicted time point T2 in the MED burst (p+2) and associated calculations is indicated by a second processing time ΔTp2, and the time required to perform the prediction of the third predicted time point T2 in the LONG burst (p+3) and associated calculations is indicated by a third processing time ΔTp3. Similarly, with regard to the next prediction segment r+1, the time required to perform the prediction of a fourth predicted time point T4 in a MED burst (p+3) and associated calculations is indicated by a third processing time ΔTp4.

Line (8) indicates the total time delay (latency) for the emulation test system 100 to determine at least the predicted target information of the emulated targets at the first predicted time point T1 in the LONG burst (p+2) from object transform information provided in the simulation frame m. As shown, the total time delay from the end of the simulation frame m output by the drive scene simulator 120 to the LONG burst (p+2) received by one or more of the first, second and $y^{th}$ echo signal emulators 111, 112 and 113 is the sum of the time differences ΔTa, ΔTb, ΔTc, ΔTd and ΔTe, described above. The timing is tracked using the timestamps provided by the common time base, e.g., in accordance with IEEE 1558. In this regard, the total delay time may be determined as the difference between IEEE 1588 timestamp $T_{1588\_T1}$ corresponding to the first predicted time point T1 and IEEE 1588 timestamp $T_{1588\_m}$ corresponding to the end of the simulation frame m. Accordingly, the prediction model gives the predicted target information based on object transform information that was provided ΔTa+ΔTb+ΔTc+ ΔTd+ΔTe ago. The same is true for determining total time delay at the second and third predicted time points T2 and T3 using the prediction frame r, where the time difference between the first and second predicted time points T1 and T2 would be added to determine the total time delay at the second predicted time point T2, and the time difference between the second and third predicted time points T2 and T3 would be further added to determine the total time delay at the third predicted time point T3.

The emulation test system 100 supports pause and resume functionality. For example, IEEE 1588 absolute timestamps corresponding to the pause and resume times may be included when calculating ΔTa+ΔTb+ΔTc+ΔTd +ΔTe. The duration between the pause and the resume may then be subtracted out. This may be performed for multiple pause/resume operations. During a pause state, processing logic and the prediction model of the first, second and $y^{th}$ echo signal emulators 111, 112 and 113 may be notified that the simulation is paused, so that they stop prediction and use the predicted target information last received.

Line (9) shows an emulated echo signal transmitted by one or more of the first, second and $y^{th}$ echo signal emulators 111, 112 and 113 in response to the periodic electromagnetic signal shown being received in line (6). The emulated echo signal includes echo bursts that correspond to the energy bursts in the periodic electromagnetic signal. Therefore, the emulated echo signal includes LONG echo burst (q+2), MED echo burst (q+2), LONG echo burst (q+3) and MED echo burst (q+3), which are also arranged in frames, and which are generated in response to the LONG burst (p+2), the MED echo burst (p+2), the LONG burst (p+3) and the MED burst (p+3), respectively. The predicted target information calculated for the first predicted time point T1 is used to generate the LONG echo burst (q+2), the predicted target information calculated for the second predicted time point T2 is used to generate the MED echo burst (q+2), and the predicted target information calculated for the third predicted time point T3 is used to generate the LONG echo burst (q+3).

Line (10) shows the emulated echo signal shown in line (9) received by one or more of the first, second and $x^{th}$ DUTs 101, 102 and 103 on the vehicle under test 105. As a practical matter, the timing of receiving the emulated echo signal substantially matches the timing of transmitting the emulated echo signal, so the echo bursts shown in line (10) are substantially the same as the echo bursts shown in line (9), ignoring the de minimis propagation delay of the electromagnetic signal. The vehicle under test 105 reacts to the received emulated echo signal, e.g., by adjusting steering, braking, throttle settings, and the like, to respond to the scene simulation generated by the drive scene simulator 120, as it would appear at the time the first, second and $x^{th}$ DUTs 101, 102 and 103 receive the emulated echo signal in real world time.

Notably, since the drive scene simulator 120, the ray tracing engine 130, and each of the first, second and $y^{th}$ echo signal emulators 111, 112 and 113 uses a common time base with precision timing hardware timestamp capability, such as IEEE 1588, they are synchronized at a sub-microsecond level. For example, IEEE 1588 provides synchronization accuracy of 20 ns to 100 ns.

Figure 3:
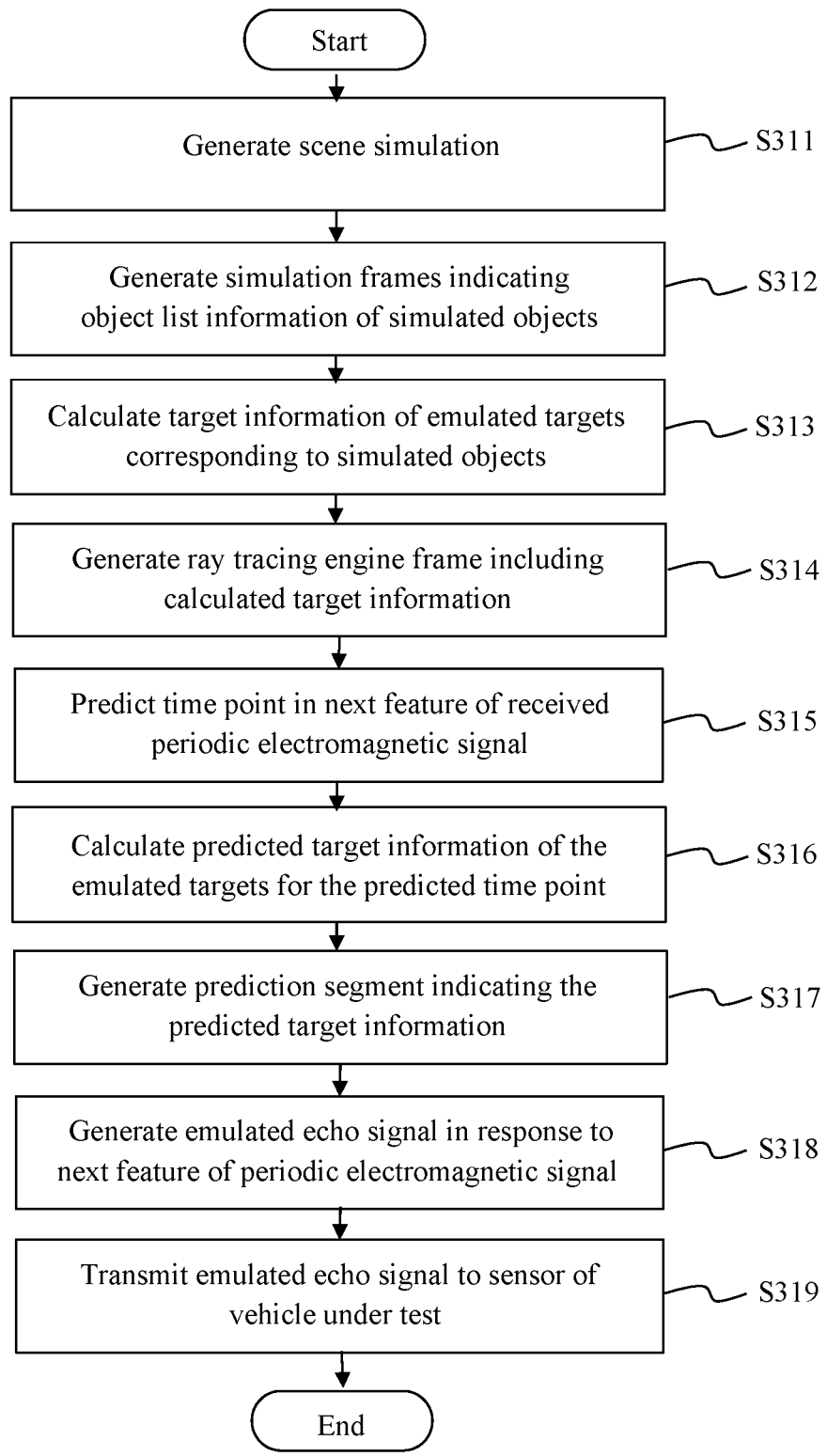
FIG. 3 is a simplified flowchart showing a method of time adjusting emulated echo signals in response to detection and ranging electromagnetic signals for testing vehicular detection and ranging electromagnetic signals, according to a representative embodiment.

FIG. 3 is a simplified flowchart showing a method of time adjusting emulated echo signals in response to detection and ranging electromagnetic signals for testing vehicular detection and ranging electromagnetic signals, according to a representative embodiment.

Referring to FIG. 3, in block S311, a scene simulation is generated by a drive scene simulator (120). The scene simulation includes one or more simulated objects that are intended to represent objects that may be encountered by a vehicle during while driving, such as other vehicles, pedestrians, street signs, curbs, telephone poles, foreign objects in the path of the vehicle, and the like.

In block S312, simulator frames are generated by the drive scene simulator providing object transform information about the simulated objects. The object transform information includes position (in 3D), yaw, pitch and roll of each of the simulated objects. The simulator frames depend, in part, using 3D geometry information of the scene simulation, including a list of objects in the simulated scene, as well as information relating to each of the simulated objects, such as position and whether each simulated object is stationary or movable. The 3D geometry information also includes data indicating the 3D surfaces of each simulated object. The 3D geometry information does not change once the scene simulation starts. Each simulation frame has a simulation time in the scene simulation and a corresponding real world time that may be different from the simulation time. The simulation time is provided by a time simulator of the drive scene simulator. The real world time of the simulation frame is the amount of time spent to generate the simulation frame.

In block S313, the object transform information regarding the simulated objects is received from a simulation frame at a ray tracing engine (130), which calculates target information, including updated positions, velocities, accelerations and cross-sections of emulated targets, as a function of time based on the object transform information. The target information is also calculated based on the 3D geometry information that was initially provided to the ray tracing engine by the drive scene simulator before the scene simulation started. In block S314, a ray tracing frame corresponding to the simulation frame is generated by the ray tracing engine. The ray tracing frame includes the calculated target information, indicating the calculated positions, velocities, accelerations and cross-sections of the emulated targets.

In block S315, a time point is predicted by a prediction model (115) in a next feature (e.g., a next RF energy burst or a next laser pulse) of a periodic detection and ranging electromagnetic signal received at an echo signal emulator (111, 112, 113). The electromagnetic signal may be received from a DUT on a vehicle under test, such as a radar sensor or a lidar sensor. The predicted time point may be a beginning point, a middle point or an end point of the next feature, for example, although other points within the next feature or within the frame containing the next feature may be used without departing from the scope of the present teachings. In an embodiment, the time point may be predicted based on the periodic nature of the detection and ranging electromagnetic signal. For example, the timing of a point in the next feature may be predicted using an established pattern of features and/or frames including the features, including the length of the features and the time lapse between adjacently occurring features. The pattern may be established by measuring the electromagnetic signal or using sensor specifications of the DUT. In block S316, predicted target information of the emulated targets is calculated for the predicted time point using the calculated target information received from the ray tracing frame. The calculated target information is projected as a function of a real time clock ahead to the predicted time point, e.g., by forward propagation and/or extrapolation.

In block S317, a prediction segment is provided by the prediction model indicating the predicted target information of the emulated targets before the next feature of the electromagnetic signal is received. The prediction segment compensates for latencies, which are introduced by time delays caused by a difference between the real world time and the simulation time of the simulation frame, by generating the ray tracing frame, and by calculating the predicted target information of the emulated targets at the predicted time point. The simulation frame, the ray tracing frame, and the prediction segment are generated using a common time base for synchronizing timing at a sub-microsecond level, which enables synchronization of the various frames and segments, and ultimately for latency compensation. The common time base may be provided in accordance with the IEEE 1588 standard, for example.

In block S318, an emulated echo signal is generated by an echo signal emulator (111, 112, 113) in response to the next burst of the received electromagnetic signal using the predicted target information of the emulated targets. The emulated echo signal is transmitted by the echo signal emulator to the DUT (sensor) that transmitted the periodic electromagnetic signal in block S319. The emulated echo signal indicates the predicted target information, so that the vehicle under test can determine at least the locations and velocities of the emulated targets in relation to the DUT, as well as the cross-sections. The vehicle under test is therefore able to react to the received emulated echo signal, e.g., by adjusting steering, braking, throttle settings, and the like, to respond to the scene simulation generated by the drive scene simulator, as it would appear at the time at the DUT would receive the emulated echo signal in real world time.

According to the various embodiments, all components in the emulation system are synchronized at sub-microsecond level at low cost, since off-the-shelf, computer industry-standard networking equipment supporting precision time standards, such as IEEE 1588, is used to achieve synchronization instead of expensive and additional custom wiring carrying synchronization signals. The processing latency for each hardware echo signal emulator can be compensated for by a prediction model, improving system performance and ensuring data consistency across all sensors. System emulation pause and resume functionality is easy to be implemented based on this approach. By maintaining a mapping between simulator time and real world time, this approach does not require the real-time drive scene simulator. This approach is scalable with the number of sensors, and has good scalability to support various sensors, including radar, lidar, and cameras, for example. Each processing unit in the emulation test system may be programmed so it effectively performs operations at the real world time without requiring traditional parallel programming techniques, which are error-prone and require programmers with that specialized expertise.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An emulation test system for time adjusting emulated echo signals in response to a periodic detection and ranging electromagnetic signal reflected, the system comprising:
    a drive scene simulation server programmed to generate a scene simulation comprising simulated objects, and to generate simulation frames indicating object transform information regarding the simulated objects, each simulation frame having a simulation time in the scene simulation and a corresponding real world time different from the simulation time, wherein the real world time is an amount of time spent to generate the simulation frame;
    a ray tracing engine server programmed to receive the object transform information regarding the simulated objects from the simulation frames, to calculate target information comprising at least positions and velocities of emulated targets corresponding to the simulated objects based on the received object transform information, and to generate a ray tracing frame corresponding to the simulation frame indicating the calculated target information; and
    an echo signal emulator configured to receive a periodic detection and ranging electromagnetic signal from a sensor and to generate an emulated echo signal in response, the periodic detection and ranging electromagnetic signal having features in a feature pattern, wherein the echo signal emulator comprises a prediction model programmed to predict a time point in a next feature of the electromagnetic signal, to calculate predicted target information of the emulated targets at the predicted time point using the calculated target information, and to generate a prediction segment indicating the predicted target information before the next feature of the electromagnetic signal is received, the predicted target information being used to generate the emulated echo signal,
    wherein the drive scene simulation server, the ray tracing engine server, and the echo signal emulator have a common time base for synchronizing the real world time at a sub-microsecond level.

2. The system of claim 1, wherein the prediction model compensates for delay introduced by each of the real world time of the simulation frame, the drive scene simulation server and the ray tracing engine server when calculating the predicted target information of the emulated targets at the predicted time point.

3. The system of claim 2, wherein the periodic detection and ranging electromagnetic signal is a radar signal, and the features in the feature pattern comprise radio frequency (RF) energy bursts.

4. The system of claim 2, wherein the periodic detection and ranging electromagnetic signal is a lidar signal, and the features in the feature pattern comprise laser pulses.

5. The system of claim 2, wherein the prediction model is programmed to predict the time point in the next feature of the electromagnetic signal using a measured time of a previous feature of the electromagnetic signal.

6. The system of claim 1, wherein the common time base is provided in accordance with IEEE 1588 standard.

7. The system of claim 1, wherein the drive scene simulation server is further programmed to skip generating one or more next simulation frames to enable the simulation time to catch up to the real world time.

8. The system of claim 1, wherein the simulation time of the simulation frame and each subsequent simulation frame is fixed, and the real world time of the simulation frame and each subsequent simulation frame is varied.

9. The system of claim 1, wherein the simulation time of the simulation frame and each subsequent simulation frame is varied, and the real world time of the simulation frame and each subsequent simulation frame is varied.

10. A method of time adjusting emulated echo signals of detection and ranging electromagnetic signals reflected from an emulated target, the method comprising:
    generating a scene simulation comprising a plurality of simulated objects;
    generating a plurality of simulation frames indicating object transform information regarding the simulated objects, each simulation frame having a simulation time in the scene simulation and a corresponding real world time different from the simulation time, wherein the real world time is an amount of time spent to generate the simulation frame;
    receiving the object transform information from a simulation frame of the plurality of simulation frames, and calculating positions and velocities of emulated targets corresponding to the simulated objects based on the received object transform information;

generating a ray tracing frame corresponding to the simulation frame indicating the calculated positions and velocities of the emulated targets;
predicting a time point in a next feature in a feature pattern of a received electromagnetic signal;
calculating predicted target information of the emulated target at the predicted time point using the calculated positions and velocities of the emulated targets from the ray tracing frame;
generating a prediction segment indicating the predicted target information as a function of real world time before a next burst of the electromagnetic signal is received, wherein the prediction segment compensates for latencies introduced by a difference between the real world time and the simulation time of the simulation frame, by generating the ray tracing frame, and by the calculating the predicted target information at the predicted time point; and
generating an echo signal in response to the next burst of the received electromagnetic signal using the predicted target information of the emulated targets the prediction segment.

11. The method of claim 10, wherein the simulation frame, the ray tracing frame, and the prediction segment are time synchronized at a sub-microsecond level using a common time base.

12. The method of claim 11, wherein the common time base is provided in accordance with IEEE 1588 standard.

13. The method of claim 10, wherein the predicting the time point in the next feature comprises measuring a time of a corresponding time point in a previous feature in the feature pattern and adding the measured time to the corresponding time point.

14. A non-transitory computer readable medium having stored thereon software instructions that, when executed by a processor, cause the processor to perform a method for time adjusting emulated echo signals of detection and ranging electromagnetic signals reflected from an emulated target comprising:
generating a scene simulation comprising a plurality of simulated objects;
generating a plurality of simulation frames indicating object transform information regarding the simulated objects, each simulation frame having a simulation time in the scene simulation and a corresponding real world time different from the simulation time, wherein the real world time is an amount of time spent to generate the simulation frame;
calculating positions, velocities and accelerations of emulated targets corresponding to the simulated objects based on the object transform information in a simulation frame of the plurality of simulation frames;
generating a ray tracing frame corresponding to the simulation frame indicating the calculated positions, velocities and accelerations of the emulated targets;
predicting a time point in a next feature in a feature pattern of a received electromagnetic signal;
calculating predicted target information comprising positions and velocities of the emulated targets at the predicted time point using the calculated positions, velocities and accelerations of the emulated targets from the ray tracing frame; and
generating a prediction segment indicating the predicted target information as a function of real world time before a next burst of the electromagnetic signal is received, wherein the prediction segment compensates for latencies introduced by a difference between the real world time and the simulation time of the simulation frame, by generating the ray tracing frame, and by the calculating the predicted target information at the predicted time point,
wherein an echo signal is generated in response to the next burst of the received electromagnetic signal using the predicted target information of the emulated targets in the prediction segment.

15. The non-transitory computer readable medium of claim 14, wherein the simulation frame, the ray tracing frame, and the prediction segment are time synchronized at a sub-microsecond level using a common time base.

16. The non-transitory computer readable medium of claim 15, wherein the common time base is provided in accordance with IEEE 1588 standard.

17. The non-transitory computer readable medium of claim 14, wherein the object transform information comprises position, yaw, pitch and roll of the simulated objects.

18. The non-transitory computer readable medium of claim 14, wherein the simulation time of the simulation frame and each subsequent simulation frame is fixed, and the real world time of the simulation frame and each subsequent simulation frame is varied.

19. The non-transitory computer readable medium of claim 14, wherein the received electromagnetic signal is a radar signal, and the next feature in the feature pattern comprises a radio frequency (RF) energy burst.

20. The non-transitory computer readable medium of claim 14, wherein the received electromagnetic signal is a lidar signal, and the next feature in the feature pattern comprises a laser pulse.

* * * * *